(12) United States Patent
Adkisson et al.

(10) Patent No.: US 7,219,268 B2
(45) Date of Patent: May 15, 2007

(54) SYSTEM AND METHOD FOR DETERMINING TRANSACTION TIME-OUT

(75) Inventors: Richard W. Adkisson, Dallas, TX (US); Huai-Ter V. Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 10/435,127

(22) Filed: May 9, 2003

(65) Prior Publication Data

US 2004/0237006 A1    Nov. 25, 2004

(51) Int. Cl.
G06F 11/00    (2006.01)

(52) U.S. Cl. .............................. 714/55; 714/47; 714/51; 713/502

(58) Field of Classification Search .................. 714/47, 714/51, 55; 713/502
See application file for complete search history.

(56) References Cited

U.S. PATENT DOCUMENTS

| | | | |
|---|---|---|---|
| 5,649,096 A | 7/1997 | Desubijana et al. | |
| 5,659,720 A | 8/1997 | Fiacco et al. | |
| 6,473,826 B1 | 10/2002 | Allingham | |
| 6,526,433 B1 | 2/2003 | Chang et al. | |
| 6,892,331 B2 * | 5/2005 | Da Palma et al. | ............... 714/5 |
| 2002/0004851 A1* | 1/2002 | Matena et al. | ............... 709/315 |
| 2003/0084364 A1 | 5/2003 | Jakubiec | |

OTHER PUBLICATIONS

Chris Greer, Patent Application, entitled "System and Method for In-Order Queue Draining," filed May 9, 2003.
Richard W. Adkisson et al., Patent Application, "Systems and Methods Controlling Transaction Draining for Error Recovery," filed on May 9, 2003.
Richard W. Adkisson et al., Patent Application, "System and Method for Error Capture and Logging in Computer Systems," filed on May 9, 2003.
Affidavit of Richard W. Adkisson, Feb. 17, 2005, 4 pages.
German Office Action issued for German application No. 10 2004 003 102.9-53 dated Feb. 7, 2006.

* cited by examiner

*Primary Examiner*—Robert Beausoliel
*Assistant Examiner*—Charles Ehne

(57) ABSTRACT

Disclosed are systems and methods for determining time-outs with respect to a plurality of transactions comprising utilizing a first time-out clock for simultaneously determining time-out states with respect to a first set of transactions of the plurality of transactions, and determining when transactions of the first set of transactions have reached a timed-out state of the time-out states.

25 Claims, 2 Drawing Sheets

SYSTEM AND METHOD FOR DETERMINING TRANSACTION TIME-OUT

CROSS-REFERENCE TO RELATED APPLICATIONS

The present application is related to concurrently filed, co-pending and commonly assigned U.S. patent applications Ser. No. 10/434,685 entitled "System and Method for In-Order Queue Draining," Ser. No. 10/434,920 entitled "Systems and Methods Controlling Transaction Draining for Error Recovery," and Ser. No. 10/434,925 entitled "System and Method for Error Capture and Logging in Computer Systems," the disclosures of which are hereby incorporated herein by reference.

BACKGROUND

It is not uncommon today for a computer system to be quite complex, often including multiple processors configured to provide parallel and/or distributed processing. For example, multi-processor computer systems often include not only multiple main processing units (MPUs), but may also include multiple support processors or agents, such as memory processors and the like. These various processors, as well as other system resources such as memory, input/output devices, disk devices, and the like, may be distributed throughout the computer system with communication provided by various buses. For example, a computer system may comprise a number of sub-modules, referred to herein as cells or cell cards, having a number of system resources, such as main processing units (MPUs), agents, and/or memories, and buses disposed thereon. System resources of a sub-module may make and/or service requests to and/or from other system resources. Such system resources may be associated with the same sub-module and/or other sub-modules of the system.

To service requests from multiple system resources in an orderly and predictable manner, systems may implement various bus protocols and transaction queues. For example, transaction queues may store information with respect to particular transactions "in-process" for a particular system resource. A processor, for example, may issue a large number of transactions, such as a number of memory reads, wherein a header and/or data return, such as a memory return, is expected in normal operation. If the processor issues a transaction and the transaction does not return, then the processor may experience an, perhaps critical, error condition.

If an error in operation of any aspect of the system, such as with respect to any one of the aforementioned system resources, is detected by the system, an error signal may be generated to notify the appropriate system resources. Such errors may be non-critical, such as isolated to the operation of a single system resource and/or associated with a recoverable operation. However, such errors may be critical in nature, such as requiring initialization of an entire bus (referred to herein as a bus initialization or BINIT error) and, therefore, the system resources thereon.

Generally it is desirable to avoid particular error conditions, particularly critical error conditions wherein system resources are "hung" from further processing or which require initialization of a plurality of system resources. Therefore certain predicable events, such as failure of particular transaction returns, may be dealt with in a manner calculated to minimize impact upon system operation, such as to avoid a critical error situation.

There may be a number of reasons for a failure to receive a transaction return, such as where a call has been made to some hardware that has not been installed in the system or which has been removed and the software is attempting to discover the hardware environment. Accordingly, systems have implemented timing operations wherein the system will time-out in a predictable and graceful way, such that the software will realize, for example, that a particular piece of hardware does not exist and processing will continue. In the past, time-out circuits were implemented specifically with respect to a particular apparatus and/or event. For example, some input output (I/O) systems may have protocols that if a particular I/O card is not coupled to the system, a time-out counter associated with that particular I/O card will indicate a time-out period and the system will continue to process after a failed return from that I/O card. However, in a large system, implementing time-out counters with respect to each apparatus and/or event for which time-out processing may be desired can be prohibitively expensive, both in resources and processing overhead.

SUMMARY

A method for determining time-outs with respect to a plurality of transactions, the method comprising, utilizing a first time-out clock for simultaneously determining time-out states with respect to a first set of transactions of the plurality of transactions, and determining when transactions of the first set of transactions have reached a timed-out state of the time-out states.

A system for determining time-outs with respect to a plurality of transactions, the system comprising, a first time-out counter providing a time-out interval of a first predetermined length, and a first plurality of state registers each being associated with a corresponding transaction of the plurality of transactions, wherein states of the first plurality of state registers are advanced to a next state in accordance with the time-out interval of the first time-out counter, and wherein a particular state of the state register advanced to in accordance with the time-out intervals corresponds to a timed-out state.

A system for determining time-outs with respect to a plurality of transactions, the system comprising, a first state machine having at least a pending state, a first time-out state and a timed-out state for each of a first set of transactions of the plurality of transactions, wherein the first state machine is operable to sequence transactions of the first set of transactions to the pending state irrespective of the status of a first time-out counter and is operable to sequence the transactions of the first set of transactions from the pending state to the first time-out state in accordance with expiration of the first time-out counter, wherein the timed-out state is entered by the transactions of the first set of transactions in accordance with expiration of the first time-out counter.

DETAILED DESCRIPTION

Figure 1:
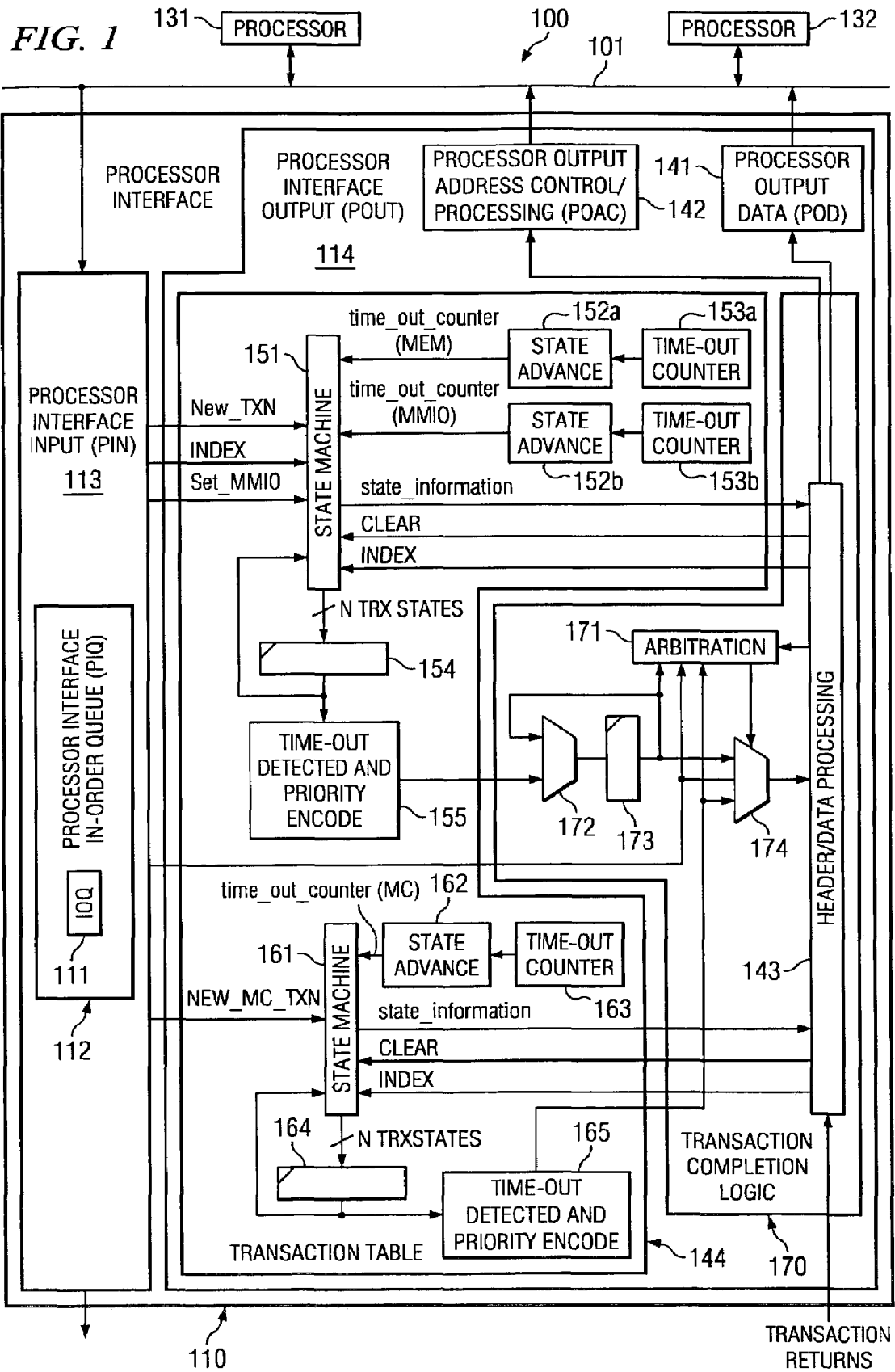
FIG. 1 shows a portion of a multi-processor system in which an embodiment of the present invention is implemented.

Embodiments of the present invention provide time-out tracking with respect to a plurality of apparatus and/or events using a minimum amount of resources. According to embodiments, time-out periods are implemented with a window of uncertainty with respect to their actual period, although a large number of independent and asynchronous events may be provided time-out tracking. Moreover, by leveraging implementations in which a large number of events may be provided time-out tracking using a minimum amount of resources, embodiments of the present invention economically facilitate the use of different time-out periods, such as to accommodate different types of events and/or situations.

In operation according to embodiments of the present invention, system resources, such as processors, issue transactions which are tracked through completion. For example, a processor may issue a memory read, the transaction is input into a transaction table, and transaction time-out tracking according to the present invention is implemented. In normal operation, the transaction is processed by a memory system which returns a data packet, and the return is processed through reference to the transaction table. However, if the transaction response is not returned within a time-out period, as determined by operation of an embodiment of the invention, transaction time-out processing is preferably implemented to facilitate continued and predictable system operation. For example, embodiments will force completion of the transaction, such as to issue a return, perhaps including spoofed or contrived data depending upon the transaction type etcetera.

According to embodiments of the present invention, transactions are classified and a time-out incremental state machine implemented with respect to each such transaction. A transaction time-out counter may be provided for each different type of transaction for which time-out tracking is to be provided according to embodiments of the invention. Accordingly, a small number of transaction time-out counters may be implemented with respect to a large number of transactions for which time-out tracking is implemented.

The transaction time-out counters associated with the various different classifications of transactions may provide different time-out periods. For example, depending upon what the transaction is, it may be desirable to allow increased or decreased time-out periods, such as where a transaction is associated with a system resource or resources disposed relatively distant in the system or where a transaction is associated with performance by a number of system resources.

Preferably, the transaction time-out counters will each roll over, e.g., count down, in predetermined periods of time which are less than the desired time-out periods for that classification of transaction. According to embodiments of the invention, each time a transaction time-out counter rolls over, the logic of each corresponding time-out state machine (e.g., those state machines for transactions classified as a the type of transaction associated with the particular time-out counter) is advanced to a new state. Once a time-out state is reached, transaction time-out processing is preferably invoked. Because a plurality of tracked transactions may transition to a timed-out state concurrently, embodiments of the invention implement transaction completion logic which arbitrates time-out processing. For example, timed-out transactions may be priority encoded, e.g., based upon transaction type, a position in a tracking table, etcetera, for processing by the transaction completion logic.

Transaction completion logic of embodiments of the invention may step through each such timed-out transaction and clear it out of the system, such as by forcing a transaction completion and removing the transaction from the transaction tracking table. The aforementioned forced completion of timed-out transactions are preferably arbitrated by the transaction completion logic to facilitate continued handling of properly returned transactions along with the timed-out transactions. Moreover, embodiments provide for different types of time-outs, such as may be associated with various types of transactions, which may be arbitrated by the transaction completion logic. Embodiments of the invention also accommodate actual return of a transaction for which a transaction time-out period has expired and transaction time-out processing has already commenced.

Directing attention to FIG. 1, a portion of a computer system in which an embodiment of the present invention is implemented is shown generally as 100. The host system of which system portion 100 is a part of may comprise a multi-processor system, such as a Hewlett Packard rx series server system implementing a plurality of Intel ITANIUM processors.

System portion 100 illustrated in FIG. 1 includes a plurality of processors, here processors 131 and 132, disposed upon bus 101. Bus 101 may be utilized in providing communication between various system resources, such as main processing units (MPUs), e.g., the aforementioned ITANIUM processors, e.g., processors 131 and 132, memory (not shown), and/or the like. Also coupled to bus 101 of the illustrated embodiment is processor interface 110, including processor interface input (PIN) block 113 and processor interface output (POUT) block 114.

Processor interface input block 113 of the illustrated embodiment includes processor interface in-order queue (PIQ) 112. Processor interface in-order queue 112 comprises in-order queue 111, which is utilized to track transaction phases to ensure completion of transactions on the bus in-order according to an overriding protocol.

Processor output block 114 comprises header/data processing block 143, operable with out-of-order queue or transaction table 144, to track transaction execution on the bus which may be returned in any order. Processor output address control/processing (POAC) block 142 and processor output data (POD) block 141 of processor output block 114 cooperate with transaction table 144 and/or header/data processing block 143 to output header and data information in accordance with transactions on bus 101.

It should be appreciated that system portion 100 may represent only a small portion of a particular system. Accordingly, the system of which system portion 100 comprises a part of may include processors, buses, processor interfaces, and/or other system resources in addition to those shown.

In operation according to one embodiment, transactions issued by a processor, such as processors 131 and 132, are first processed in processor interface in-order queue 112. Accordingly, a transaction may be processed in-order, such as to include a transaction request phase, a data snoop phase, and a data response phase as reflected by states stored in in-order queue 111. After completing the in-order transaction phases associated with in-order queue 112, transactions may be tracked in transaction table 144 until completion of the transaction.

For example, when a processor performs a memory read, a memory read request from that processor may appear on the bus, be processed in the processor interface in-order queue, and be sent down to the rest of the system for actual retrieval and return of the requested data. However, while the actual retrieval and return of the requested data is being accomplished, a transaction entry may be placed in the transaction table to show that a requested memory read transaction is still pending. It is expected that the requested memory read transaction is going to be returned to the header/data processing block. Header/data processing block will accept the returned information and look to the transaction table to determine how the information is to be handled. Accordingly, a header may be provided to the processor output address controller to indicate associated data is directed toward a particular processor identified in the transaction table. Thereafter, the data may be provided to the processor output data block to put that data out on the bus with the proper information such that the processor that did the read will get that data.

Although it is expected that typical operation will result in return of transactions as set forth above, particular situations may result in a return never being provided with respect to one or more transactions. In order to avoid a processor or other system resource halting further processing (i.e., "hanging" or "freezing") and/or to properly detect error conditions, embodiments of the present invention provide transaction time-out tracking and timed-out transaction clearing. However, as systems in which embodiments of the present invention may be deployed may support a large number of concurrent transactions, embodiments of the present invention are adapted to provide the aforementioned transaction time-out tracking without implementing separate time-out counters for each transaction for which time-out tracking is provided.

Figure 2:
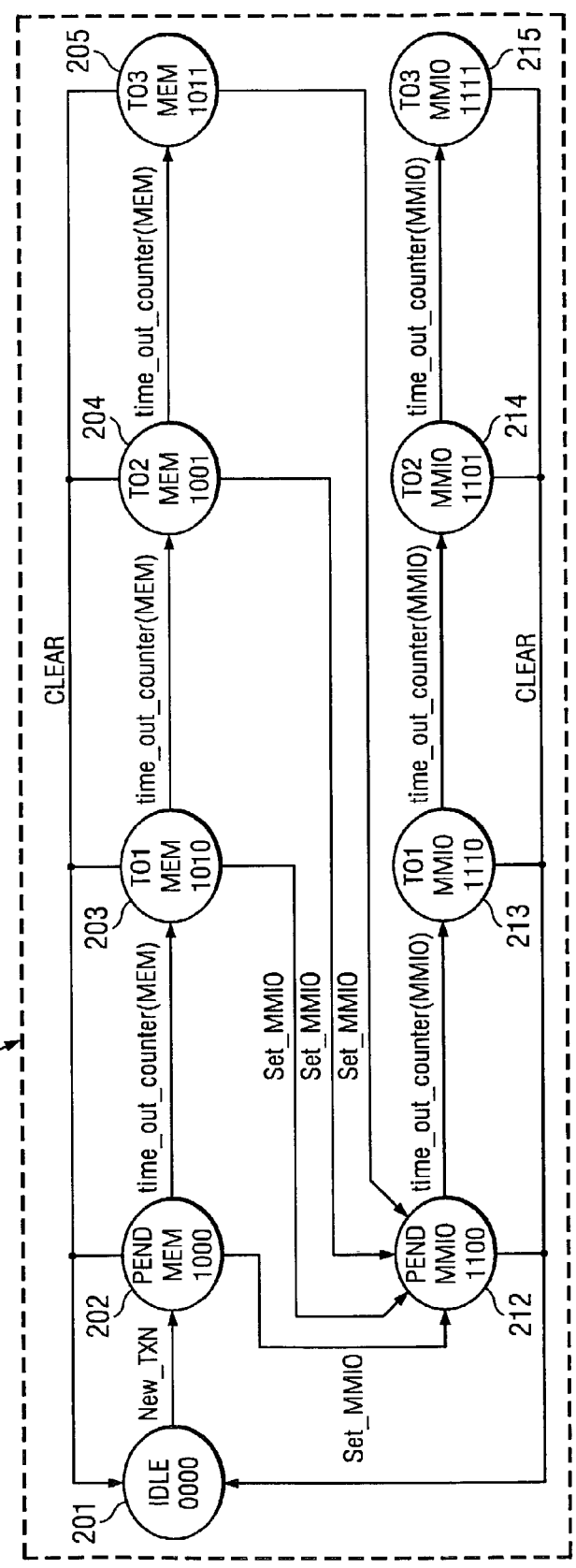
FIG. 2 shows state machines cooperative for implementing transaction time-out tracking according to embodiments of the present invention.
Figure 3:
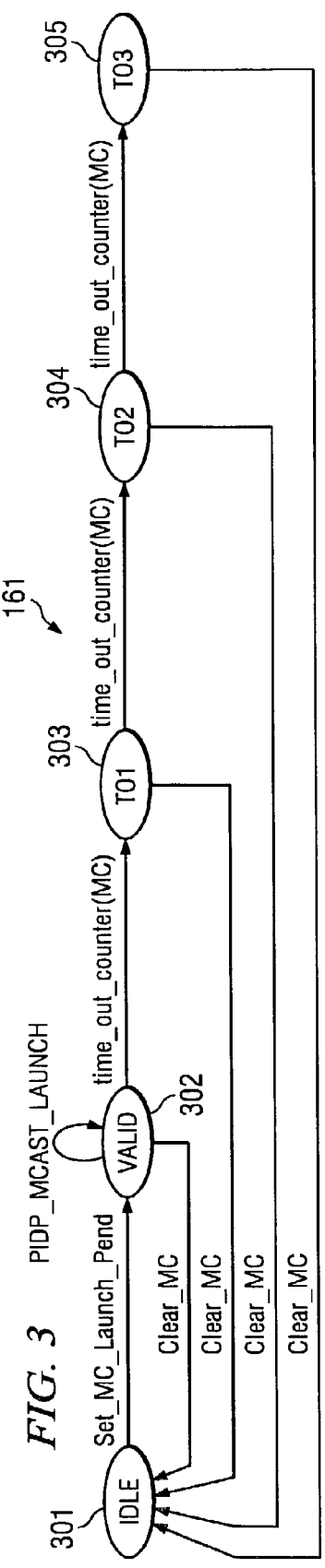
FIG. 3 shows a state machine for implementing transaction time-out tracking according to embodiments of the present invention.

Accordingly, embodiments of the present invention implement a state machine or state machines, such as state machines 151 and 161 shown in FIG. 1, providing states associated with each transaction for which time-out tracking is to be provided for determining when a particular transaction has languished beyond an associated time-out period. As is known in the art, in general a state machine is any device that stores the status of something at a given time and can operate on input to change the status and/or cause an action or output to take place for any given change. State machines 151 and 161 of the illustrated embodiment cooperate with transaction completion logic 170 to control clearing of timed-out transactions. Detail with respect to the states of state machine 151 according to an embodiment of the present invention is shown in FIG. 2. Similarly, detail with respect to the states of state machine 161 according to an embodiment of the present invention is shown in FIG. 3.

It should be appreciated that, although the illustrated embodiment includes two transaction time-out state machines, the present invention is not limited to any particular number of transaction time-out state machines. Accordingly, embodiments of the present invention may implement any desired number of transaction time-out state machines, such as may correspond to any number of classifications of transactions. Such state machines may operate cooperatively to provide time-out transaction tracking with respect to transactions, or they may operate independently.

As shown in the embodiment of FIG. 1, although state machines of embodiments may be disposed anywhere convenient to store the time-out status of transactions and can operate on input to change the status and/or cause an action or output to take place for any given change, transaction table 144 may comprise one or more state machines, such as state machines 151 and 161, of the present invention. Time-out counters and state advance logic, shown in FIG. 1 as time-out counters 153*a*, 153*b*, and 163 and state advance 152*a*, 152*b*, and 162, are provided with respect to the state machine shown in the illustrated embodiment. A time-out counter and corresponding state advance logic cooperate with a state machine to advance time-out tracked transactions through a number of states, thereby providing a desired minimum time-out period. Registers, shown here as registers 154 and 164, may cooperate with the state machines to store state information with respect to each transaction of a classification of transactions associated with a corresponding one of the state machines. Upon a particular transaction reaching a timed-out state, as may be indicated by the state stored in one of the aforementioned registers, a time-out detected and priority encode block, shown here as time-out detected and priority encode blocks 155 and 165, may provide information with respect to a particular transaction having reached a timed-out state to transaction completion logic for further processing.

Transaction completion logic 170 of the illustrated embodiment includes arbitration logic, here including arbitrator 171, multiplexer 172, register 173, and multiplexer 174, to arbitrate between multiple transactions to be cleared. The arbitration logic of the illustrated embodiment cooperates with header/data processing 143 to clear timed-out transactions, as indicated by time-out detected and priority encode blocks 155 and 165, from transaction table 144. Additionally, header/data processing 143 of a preferred embodiment forces responses with respect to particular transactions, such as to provide a data packet having spoofed data, to thereby provide an expected response to an appropriate system resource. It should be appreciated that such forced responses may follow a predetermined protocol, such as including all ones or some other known pattern, in order to alert a recipient system resource as to the timed-out condition.

It should be appreciated that header/data processing 143 may continue to receive actual transaction returns during processing of the aforementioned timed-out transactions. Moreover, such actual transaction returns may correspond to a transaction indicated as timed-out by a particular one of time-out detected and priority encode 155 and 165. Accordingly, as will be better appreciated from the discussion which follows, header/data processing 143 may override or ignore particular timed-out transaction information.

In operation according to the illustrated embodiment, a processor, such as one of processors 131 and 132, issues a new transaction which is received by processor interface input 113. Preferably, processor interface input 113 provides information with respect to particular new transactions (NEW_TXN) and associated indexing information (INDEX) to state machine 151. The indexing information may comprise a reference corresponding to a location the transaction is to be stored in transaction table 144. For example, where 64 transactions are tracked by transaction table 144, the index may be a number between zero and 63. It should be appreciated, therefore, that the state flow diagrams of FIG. 2 correspond to a single transaction index. Accordingly, multiple such state flows will preferably be implemented with respect to the plurality of transactions for which transaction time-out tracking is provided by transaction table 144 of the illustrated embodiment.

As can be seen in FIG. 2, according to one embodiment of the invention states 202-205 of state machine 151 will, at least initially, track all transactions for which processor interface input 113 asserts the NEW_TXN signal, thereby establishing a default classification (MEM) with respect to transactions corresponding to the NEW_TXN signal. However, if at any point in the transaction time-out tracking of the transaction associated with a particular index is determined to be of a different classification (MMIO), e.g., the SET_MMIO signal is asserted by processor interface input 113, states 212-215 of state machine 151 will provide transaction time-out tracking with respect to the transaction.

The transaction states with respect to a particular index as shown in FIG. 2 begin with idle state 201. Idle state 201 corresponds to there being no transaction pending with respect to the particular index for which transaction time-out tracking is currently being employed by state machine 151. However, upon assertion of the new transaction signal (NEW_TXN) by processor interface input 113, state machine 151 moves from idle state 201 to pending state 202, as may be indicated in register 154.

Transaction time-out tracking of a first transaction classification (MEM) by state machine 151 of the illustrated embodiment begins at pending state 202. Accordingly, state machine 151 moves from pending state 202 to a subsequent MEM classification time-out state, as may be indicated in register 154, upon assertion of a time-out counter signal, such as provided by state advance 152a. For example, time-out counter 153a may provide a free running clock which counts down from a predetermined number to zero, resets and then counts down again. The predetermined number may be selected so as to provide a selected MEM classification countdown interval. Each time time-out counter 153a reaches zero, state advance 152a may assert a time-out counter signal, indicating expiration of another epoch of the countdown interval for a first transaction classification (MEM), to state machine 151.

When at pending state 202, state machine 151 moves to first time-out state 203 upon assertion of the time-out counter signal by state advance 152a. Similarly, when at first time-out state 203 upon assertion of the time-out counter signal by state advance 152a, state machine 151 moves to second time-out state 204. When at second time-out state 204 upon assertion of the time-out counter signal by state advance 152a, state machine 151 moves to third time-out state 205. According to the illustrated embodiment, third time-out state 205 corresponds to a state at which the MEM transaction is to be considered timed-out. Accordingly, time-out detected and priority encode 155 may detect that a particular transaction has entered third time-out state 205 and priority encode the transaction for time-out processing by transaction completion logic 170.

If at any time during transaction time-out tracking by state machine 151, processor interface output 114 receives a transaction return and clears the particular transaction, a clear signal is preferably asserted with respect to the transaction. Upon assertion of such a clear signal, indicating completion of processing with respect to the transaction by processor interface 110, state machine 151 preferably returns to idle state 201 for that transaction.

If at any time during transaction time-out tracking by state machine 151, processor interface input 113 determines that a particular transaction is of a classification other than the default classification, e.g., MMIO rather than MEM, processor interface input 113 of the illustrated embodiment asserts the SET_MMIO signal. Upon assertion of the SET_MMIO signal, any of states 202-205 of state machine 151 will move to pending state 212, as may be indicated in register 154, for transaction time-out tracking by state machine 151.

Transaction time-out tracking of a second transaction classification (MMIO) by state machine 151 of the illustrated embodiment begins at pending state 212. Accordingly, state machine 151 moves from pending state 212 to a subsequent MMIO classification time-out state, as may be indicated by register 154, upon assertion of a time-out counter signal, such as provided by state advance 152b. For example, time-out counter 153b may provide a free running clock which counts down from a predetermined number to zero, resets and then counts down again. The predetermined number may be selected so as to provide a selected MMIO classification countdown interval. Each time time-out counter 153b reaches zero, state advance 152b may assert a time-out counter signal, indicating expiration of another epoch of the countdown interval of a second transaction classification (MMIO), to state machine 151.

When at pending state 212, state machine 151 moves to first time-out state 213 upon assertion of the time-out counter signal by state advance 152b. Similarly, when at first time-out state 213 upon assertion of the time-out counter signal by state advance 152b, state machine 151 moves to second time-out state 214. When at second time-out state 214 upon assertion of the time-out counter signal by state advance 152b, state machine 151 moves to third time-out state 215. According to the illustrated embodiment, third time-out state 215 corresponds to a state at which the MMIO transaction is to be considered timed-out. Accordingly, time-out detected and priority encode 155 may detect that a particular transaction has entered third time-out state 215 and priority encode the transaction for time-out processing by transaction completion logic 170.

If at any time during transaction time-out tracking by state machine 151, processor interface output 114 receives a transaction return and clears the particular transaction, a clear signal is preferably asserted with respect to the transaction. Upon assertion of such a clear signal, indicating completion of processing with respect to the transaction by processor interface 110, state machine 151 preferably returns to idle state 201 for that transaction.

From the above, it should be appreciated that any number of different time-out counters could be implemented according to the present invention, such as to accommodate a desired number of different transaction types. Each such counter may be programmable to provide desired time-out periods, thereby providing independent and different time-out periods for each transaction classification. For example, a MMIO transaction may be associated with a part of the system which may not exist and, therefore, time-out counter 153b may be programmed to provide a longer epoch than time-out counter 153a in order to facilitate improved system operation with respect to MMIO transactions.

It should also be appreciated that operation of the illustrated embodiment of state machine 151 provides for at least 2 complete time-out epochs as defined by the associated time-out counters. Specifically, as the time-out counters of the illustrated embodiment are free running, a particular transaction may enter the pending states of either transaction classification of state machine 151 (states 202 and 212), at any point in a current epoch of the corresponding time-out counter. However, the time-out state of that transaction as tracked by the state machine does not move to subsequent states (e.g., time-out states 203-205 and 213-215, respectively) until a complete time-out epoch according to the corresponding time-out counter has elapsed. As entry into third time-out state 205 and 215 of the illustrated embodiment is associated with the associated transaction being timed-out, time-out processing by transaction completion logic 170 may begin immediately after either state machine moves to this final time-out state. Accordingly, the time-out period associated with each transaction classification of state machine 151 is at least 2 times the time-out epoch defined by time-out counter 153*a* and 153*b*, respectively.

Embodiments of the present invention establish a time-out period window, wherein a minimum time-out period corresponds to twice the associated time-out counter epoch and a maximum time-out period corresponds to thrice the associated time-out counter. As an example of a situation in which a maximum time-out period is experienced, a new transaction signal may be asserted just after time-out counter 153*a* has reset from a previous epoch. Accordingly, a complete epoch of time-out counter 153*a* may elapse before state machine 151 moves from pending state 202 to first time-out state 203. Time-out processing by transaction completion logic 170 will not begin until after three epochs of time-out counter 153*a*, thereby establishing a maximum time-out period of 3 times the time-out counter. Accordingly, if time-out counter 153*a* is programmed for a 25 msec epoch, a MEM transaction will be considered timed-out according to the illustrated embodiment if a transaction return has not been received by header/data processing 143 somewhere within 50-75 msec after the transaction is entered into transaction table 144, depending upon where time-out counter 153*a* was in its countdown when the transaction entered the transaction table.

It should be appreciated that time-out counters 153*a* and 153*b* may economically implement a counter of relatively high resolution, such as on the order of 32 bits, as very few such counters are utilized in providing transaction time-out tracking according to embodiments of the present invention. Such a high resolution counter implemented with the state machines of the illustrated embodiment facilitates a wide range of time-out periods. For example, using a 32 bit time-out counter, embodiments of the present invention may provide a time-out period in the range of 17.2 to 25.8 seconds on the high end or a time-out period on the order of milliseconds on the low end.

Although some counter resolution is given up in the transaction time-out state machine of the illustrated embodiment, it should be appreciated that various numbers of time-out states, including different numbers of time-out states with respect to each state machine, may be implemented to provide a desired level of resolution. However, it should be appreciated that addition of such time-out states may increase overhead with respect to each transaction tracked by such a state machine, in that more bits may be utilized in tracking states in the appropriate registers.

The illustrated embodiment of state machine 151 utilizes 2 bits for time-out state tracking (e.g., 00 pending state, 10 first time-out state, 01 second time-out state, and 11 third time-out state), with another 2 bits being used to indicate tracking status and the transaction classification (e.g., 10 indicating pending transaction of MEM classification, and 11 indicating pending transaction of MMIO classification). Of course, other implementations may be adopted to provide tracking of desired time-out information, if desired.

As mentioned above, when transactions reach the final time-out state, states 205 and 215 in the illustrated embodiment of state machine 151, time-out detected and priority encode 155 preferably detects the transaction state and encode the transaction for further processing by transaction completion logic 170. For example, time-out detected and priority encode 155 may identify a particular index stored in register 154 which has reached the timed-out state and provide that index to transaction completion logic 170 for forcing a response, clearing the transaction, etcetera. However, multiple ones of the transactions may reach a timed-out state simultaneously. Therefore priority encode circuitry of time-out detected and priority encode 155 establish a priority with respect to each such transaction to facilitate their processing serially. For example, transactions may be prioritized for further processing based upon their associated index. Additionally or alternatively, transactions may be prioritized based upon transaction type, requesting system resource, etcetera. Moreover, as a plurality of transactions may be indicated as timed-out contemporaneously by multiple ones of the time-out detected and priority encode blocks of the illustrated embodiment, arbitration logic, such as arbitrator 171 and multiplexer 174 of the illustrated embodiment, arbitrates serial provision of the timed-out transactions to header/data processing 143. Of course, alternative embodiments may provide for parallel processing of timed-out transactions, if desired.

According to one embodiment of the present invention, header/data processing 143 accepts a transaction time-out signal asserted by multiplexer 174 and queries transaction table for information regarding the particular transaction. For example, as header/data processing 143 continues to receive transaction returns during a time in which transactions determined to be timed-out are arbitrated by arbitrator 171, it is possible that the particular transaction has returned and been normally processed by header/data processing. Thus, transaction table 144 would no longer show the particular transaction in time-out and header/data processing 143 may discard the time-out information, or perhaps log a record to indicate an unsatisfactory return latency with respect to the transaction. However, if the query of transaction table 144 by header/data processing 143 reveals that the transaction is still in time-out, header/data processing 143 preferably determines a proper course of action to take, such as what kind of return to send to the requesting processor.

For example, if there is hardware in the system that does not exist, the transaction may be classified as a MMIO transaction and the fact that a time-out occurred will not be considered critical, therefore suggesting that a predetermined return packet, such as may include all ones, may be forced by header/data processing 143 to notify the requesting processor of the lack of the particular hardware. If the transaction requested data from memory that is disposed in another domain, a time-out may result in a determination that a more serious error be flagged, however header/data processing 143 may still force a return packet, such as may include all ones, to again facilitate further processing with respect to the requesting processor. However, if the transaction requested data from memory which is disposed in a domain considered local to processor interface 110, a critical error may be flagged and header/data processing 143 may not force a return or may return a packet for gracefully crashing the domain and/or initializing aspects of the system. Of course, the above courses of action are merely exemplary and any suitable courses of action, whether forcing returns, flagging errors, implementing retries, etcetera, and/or combinations thereof, may be implemented according to the present invention.

After processing of a particular transaction by header/data processing 143, transaction table 144 is preferably updated to reflect the completed status of the transaction. Accordingly, after forcing a return, or otherwise completing processing with respect to a particular transaction, header/data processing 143 preferably provides a clear signal with respect to state machine 151 to cause the state machine to move from the timed-out state (third time-out state 205 and third time-out state 215, respectively) to idle state 201. Thereafter, the state machine is ready to invoke transaction time-out transaction tracking with respect to another transaction subsequently assigned the now cleared index.

Directing attention to FIG. 3, another state machine provided according to an embodiment of the present invention is shown. Specifically, state machine 161, such as may be associated with transactions classified as multi-cast (MC), is shown in FIG. 3. State machine 161 of a preferred embodiment is disposed in transaction table 114 to facilitate time-out tracking of such multi-cast transactions and provides timed-out transaction information to multiplexer 174 of the arbitration logic of transaction completion logic 170 substantially as described above with respect to state machine 151. It should be appreciated that state advance 162, time-out counter 163, registers 164, and time-out detected and priority encode 165 of a preferred embodiment operate with respect to state machine 161 substantially as corresponding components (e.g., state advance 152a, time-out counter 153a, registers 154, and time-out detected and priority encode 155) described above with respect to state machine 151.

Multi-cast transactions may provide multi-point packets directed to a plurality of system resources, rather than a single system resource as is common for many transactions. For example, a processor bus in one of the cells of a system may issue a cache sync packet which is to be sent to a plurality of system resources, such as all processors in a protection domain (i.e., all cells operable under control of a particular operating system). Each processor bus of a protection domain would need to see this cache sync signal in order to do a cache sync. Accordingly, in normal operation a processor interface may receive such a multi-cast packet request from an associated processor and send it to all the cells that are in that protection domain, expecting an acknowledgement for each request packet sent. However, a cell might comprise multiple processors and/or multiple buses. Although the multi-cast packet cache sync is ultimately acted upon by a plurality of system resources within a single cell, the requesting system resource may expect only a single acknowledgement from each cell. Accordingly, such multi-cast transactions may have multiple transaction returns associated therewith, wherein the last expected one of which results in a return being issued to a requesting system resource.

Time-out counter 163 and state advance logic 162, operable as described above with respect to state machine 151, may be provided with respect to state machine 161. Such a time-out counter and corresponding state advance logic may cooperate with state machine 161 to advance time-out tracked transactions through a number of states, thereby providing a desired minimum time-out period. Registers 164, operable as described above with respect to state machine 151, may cooperate with state machine 161 to store state information with respect to each transaction of a classification of transactions associated with that state machine. Upon a particular transaction reaching a timed-out state, as may be indicated by the state stored in one of the aforementioned registers, time-out detected and priority encode block 165, operable as described above with respect to state machine 151, may provide information with respect to a particular transaction having reached a timed-out state to transaction completion logic 170 for further processing.

In operation according to the illustrated embodiment, a processor, such as one of processors 131 and 132, issues a multi-cast transaction which is received by processor interface input 113. Processor interface 113 will assert a launch signal indicating a multi-cast transaction is about to be launched, and logic therein will determine each associated resource which will be servicing the multi-cast transaction.

The transaction states with respect to a particular transaction index as shown in FIG. 3 begin with idle state 301. Idle state 301 corresponds to there being no multi-cast transaction pending with respect to the particular index for which transaction time-out tracking is currently being employed by state machine 161. However, upon assertion of the launch signal by processor interface input 113, state machine 161 moves from idle state 301 to valid state 302.

Transaction time-out tracking of a the multi-cast transaction classification (MC) by state machine 161 of the illustrated embodiment begins at valid state 302. Accordingly, the illustrated embodiment remains in valid state 302 as associated multi-cast transactions are launched. State machine 161 moves from valid state 302 to a subsequent MC classification time-out state upon assertion of a time-out counter signal. For example, an associated time-out counter may provide a free running clock which counts down from a predetermined number to zero, resets and then counts down again. The predetermined number may be selected so as to provide a selected MC classification countdown interval. Each time the time-out counter reaches zero, an associated state advance block may assert a time-out counter signal, indicating expiration of another epoch of the countdown interval, to state machine 161.

When at valid state 302, state machine 161 moves to first time-out state 303 upon assertion of the time-out counter signal. Similarly, when at first time-out state 303 upon assertion of the time-out counter signal, state machine 161 moves to second time-out state 304 and when at second time-out state 304 upon assertion of the time-out counter signal, state machine 161 moves to third time-out state 305. According to the illustrated embodiment, third time-out state 305 corresponds to a state at which the MC transaction is to be considered timed-out. Accordingly, time-out detected and priority encode logic may detect that a particular transaction has entered third time-out state 305 and priority encode the transaction for time-out processing by transaction completion logic 170.

Because the multi-cast transaction has a plurality of transaction requests associated therewith, an embodiment of state machine 161 provides a bit for each such transaction. For example, where processor interface input 113 determines that a multi-cast transaction is to be launched with respect to 4 system resources, e.g., 4 processors of a cell, each of 4 bits may be set to one to indicate the transactions launched to each of the 4 system resources. As transaction returns associated with the multi-cast transaction are returned to processor interface output 114, information with respect to the system resource providing a transaction response may be provided to processor interface input 113 and the appropriate tracking bit changed to zero. Although one or more multi-cast returns may be received, state machine 161 of the illustrated embodiment will not reset the time-out status until all such transaction bits reflect a transaction return, thus indicating that the multi-cast transaction has completed.

It should be appreciated that state machine 161 as described above is an example of a state machine providing transaction time-out tracking with respect to a particular transaction classification independent of the operation of any other transaction time-out tracking state machine of the illustrated embodiment. Although state machines 151 and 161 of the illustrated embodiment are shown both disposed as part of transaction table 144, it should be appreciated that state machines utilized according to embodiments of the present invention may be disposed in an area of the system different that that shown and/or different than that of other state machines operable according to the present invention. Similarly, although state machines 151 and 161 of the illustrated embodiment are shown to incorporate first, second, and third time-out states, state machines of the present invention may utilize any number of time-out states. For example, different state machines of an embodiment of the present invention may each utilize different numbers of time-out states, if desired. Accordingly, it should readily be appreciated that embodiments of the present invention may implement a variety of configurations in providing transaction time-out tracking.

What is claimed is:

1. A method for determining time-outs with respect to a plurality of transactions, said method comprising:
   utilizing a first time-out clock for simultaneously determining time-out states with respect to a first set of transactions of said plurality of transactions;
   determining when transactions of said first set of transactions have reached a timed-out state of said time-out states; and
   prioritizing said transactions of said first set of transactions having reached said timed-out state for time-out processing serially.

2. The method of claim 1, wherein said first time-out clock provides epochs of a first time-out interval, said method comprising:
   moving a state associated with a transaction of said first set of transactions to a first time-out state irrespective of a state of an epoch of said first time-out interval; and
   moving said state associated with said transaction to said timed-out state upon expiration of an epoch of said first time-out interval.

3. The method of claim 1, further comprising:
   time-out processing said transactions of said first set of transactions having reached said timed-out state to thereby clear said transactions from system resources.

4. The method of claim 3, wherein said time-out processing comprises:
   determining if a particular one of said transactions currently being time-out processed has been completed normally after said particular transaction reached said timed-out state.

5. The method of claim 1, further comprising:
   utilizing a second time-out clock for simultaneously determining time-out states with respect to a second set of transactions of said plurality of transactions; and
   determining when transactions of said second set of transactions have reached a timed-out state of said time-out states.

6. The method of claim 5, wherein said first time-out clock provides epochs of a first time-out interval and said second time-out clock provides epochs of a second time-out interval, wherein said first and second time-out intervals are different.

7. The method of claim 5, further comprising:
   classifying transactions for association with said first set of transactions and said second set of transactions.

8. The method of claim 7, wherein transactions default to said first set of transactions and said classifying transactions moves particular transactions to said second set of transactions.

9. A system for determining time-outs with respect to a plurality of transactions, said system comprising:
   a first time-out counter providing a time-out interval of a first predetermined length; and
   a first plurality of state registers each being associated with a corresponding transaction of said plurality of transactions, wherein first states of said first plurality of state registers are advanced to a next state in accordance with said first time-out interval of said first time-out counter, and wherein a particular state of said first states advanced to in accordance with said time-out intervals corresponds to a timed-out state; wherein
   said first states of said first plurality of state registers comprise an initial state which is entered irrespective of a status of said time-out interval of said first time-out counter and advanced to a next state in accordance with said time-out interval of said first time-out counter, thereby providing a time-out uncertainty window with respect to said timed-out state.

10. The system of claim 9, wherein said first time-out counter provides relatively high resolution counting.

11. The system of claim 10, wherein said relatively high resolution counting comprises at least 32 bit counting.

12. The system of claim 9, wherein said time-out uncertainty window is a function of said time-out interval of said first time-out counter.

13. The system of claim 12, wherein said time-out uncertainty window defines a time-out period range of from 2 times said time-out interval of said first time-out counter to 3 times said time-out interval of said first time-out counter.

14. The system of claim 9, further comprising: priority encode logic operable to prioritize further processing with respect to a plurality of transactions having reached a timed-out state simultaneously.

15. The system of claim 9, further comprising:
   a second time-out counter providing a time-out interval of a second predetermined length, wherein second states of said first plurality of state registers are advanced to a next state in accordance with said time-out interval of said second time-out counter, and wherein a particular state of said second states advanced to in accordance with said second time-out interval corresponds to a timed-out state.

16. The system of claim 15, wherein said time-out interval of said first time-out counter is of a different predetermined length that said time-out interval of said second time-out counter.

17. The system of claim 15, wherein said first time-out counter and said first states are associated with a first classification of transaction and said second time-out counter and said second states are associated with a second classification of transactions.

18. The system of claim 15, wherein said first states and said second states are used cooperatively to determine a timed-out state with respect to a single transaction.

19. The system of claim 15, further comprising:
   arbitration logic operable to arbitrate further processing with respect to transactions having reached a timed-out state associated with said first states and transactions having reached a timed-out state associated with said second states.

20. A system for determining time-outs with respect to a plurality of transactions, said system comprising:
   a first state machine having at least a pending state, a first time-out state and a timed-out state for each of a first set of transactions of said plurality of transactions, wherein said first state machine is operable to sequence transactions of said first set of transactions to said pending state irrespective of the status of a first time-out counter and is operable to sequence said transactions of said first set of transactions from said pending state to said first time-out state in accordance with expiration of said first time-out counter, wherein said timed-out state is entered by said transactions of said first set of transactions in accordance with expiration of said first time-out counter.

21. The system of claim 20, wherein said first state machine further comprises:
a second time-out state, wherein said state machine is operable to sequence said transactions of said first set of transactions from said first time-out state to said second time-out state in accordance with expiration of said first time-out counter and is operable to sequence said transactions of said first set of transactions from said second time-out state to said timed-out state in accordance with expiration of said first time-out counter.

22. The system of claim 21, wherein said first state machine provides a time-out window having a time-out uncertainty of one period of said first time-out counter.

23. The system of claim 20, further comprising:
priority logic establishing a priority hierarchy with respect to transactions having reached said timed-out state.

24. The system of claim 20, wherein said first state machine also has at least a pending state, a first time-out state and a timed-out state for each of a second set of transactions of said plurality of transactions, wherein said first state machine is operable to sequence transactions of said second set of transactions to said pending state of said second set of transactions irrespective of the status of a second time-out counter and is operable to sequence said transactions of said second set of transactions from said pending state to said first time-out state of said second set of transactions in accordance with expiration of said second time-out counter, wherein said timed-out state of said second set of transactions is entered by said transactions of said second set of transactions in accordance with expiration of said second time-out counter.

25. The system of claim 20, further comprising:
a second state machine having at least a pending state, a first time-out state and a timed-out state for each of a third set of transactions of said plurality of transactions, wherein said second state machine is operable to sequence transactions of said third set of transactions to said pending state irrespective of the status of a third time-out counter and is operable to sequence said transactions of said third set of transactions from said pending state to said first time-out state in accordance with expiration of said third time-out counter, wherein said timed-out state is entered by said transactions of said third set of transactions in accordance with expiration of said third time-out counter.

* * * * *